(12) United States Patent
Yugami

(10) Patent No.: US 6,385,467 B1
(45) Date of Patent: May 7, 2002

(54) CIRCUIT AND METHOD FOR NOTIFYING RINGER FAILURE

(75) Inventor: Kazuyuki Yugami, Shizuoka (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/465,516

(22) Filed: Dec. 16, 1999

(30) Foreign Application Priority Data

Dec. 18, 1998 (JP) .............................................. 10-361464

(51) Int. Cl.[7] .............................. H04Q 7/20; H04Q 7/26; H04Q 7/32
(52) U.S. Cl. ........................ 455/567; 455/423; 455/424; 455/550
(58) Field of Search ................................. 455/567, 423, 455/424, 67.1, 403, 422, 550, 517, 462, 465, 575, 426

(56) References Cited

U.S. PATENT DOCUMENTS 5,819,174 A * 10/1998 Kyllonen ..................... 455/567
5,953,675 A * 9/1999 Rabina et al. .............. 455/567
6,275,700 B1 * 8/2001 Takahashi ................... 455/567

FOREIGN PATENT DOCUMENTS

JP           5-110667      4/1993

* cited by examiner

Primary Examiner—William Trost
Assistant Examiner—Keith Ferguson
(74) Attorney, Agent, or Firm—Sughrue Mion, PLLC

(57) ABSTRACT

When a ringer failure-detecting circuit (15) detects a failure (ringer failure) in a ringer-generating circuit, then a subscriber's wireless terminal equipment (10) notifies a base station (7) through a wireless line that the ringer failure has occurred in the ringer-generating circuit. Further, the base station (17) subsequently announces such a notification to a dialer.

12 Claims, 2 Drawing Sheets

CIRCUIT AND METHOD FOR NOTIFYING RINGER FAILURE

BACKGROUND OF THE INVENTION

The present invention relates to a mobile body communication technology. More particularly, it relates to a circuit and method for notifying a ringer failure, applicable to the mobile body communication technology that is referred to as a wireless local loop (hereinafter called WLL).

A prior art for detecting a ringer failure in a telephone is disclosed in, e.g., JP-A-5-110667. According to the prior art, a ringer signal-generating circuit in an exchanger includes a ringer-generating circuit, a phase control section, a timing control section, an alarm-monitoring section, and a monitoring control section. The ringer-generating circuit produces a ringer signal. The phase control section creates a phase control signal in order to impart a connection timing of the ringer signal to a load that is connected to the ringer signal. The timing control section transmits a ringer-transmitting signal to the load in response to the phase control signal from the phase control section. The alarm-monitoring section monitors any fault in the ringer-generating circuit. The monitoring control section flickers an indication lamp in response to an alarm signal from the alarm-monitoring section. In the above ringer signal-generating circuit, there is provided a ringer signal halt section-detecting circuit for detecting the alarm signal from the alarm-monitoring section only during a period of time in which the phase control signal is transmitted from the phase control section. In addition, while the ringer-transmitting signal is rendered inoperative, the ringer signal halt section-detecting circuit detects any fault developed in the ringer signal-generating circuit, and then outputs the alarm signal.

Another prior art for detecting a ringer failure in a telephone is disclosed. According to this prior art, an alarm is issued without interruption when a signal from a ringer-generating circuit is equal to or less than a predetermined value.

In WLL, when one telephone (calling telephone) calls another telephone (called telephone) that is connected to a subscriber's wireless terminal equipment, then wireless connection is established from a base station to the terminal equipment through a subscriber's line, and a call from the calling telephone is transmitted to the terminal equipment through an exchange station. However, when a ringer-generating circuit in the terminal equipment is out of order, then such a failure cannot be known at the calling telephone. Therefore, the calling telephone continues a call. This brings about a problem that both of the base station and the terminal equipment remain connected together by wireless through the subscriber's line. In this case, another problem arises with the terminal equipment of a type designed to provide a battery-assisted backup action. That is, a battery does not last for a long period of time.

SUMMARY OF THE INVENTION

An objective of the present invention is to solve the above-mentioned problems.

Moreover, an objective of the present invention is to provide a circuit and method for notifying a ringer failure, designed to allow the ringer failure in a subscriber's wireless terminal equipment to be appreciated at a base station, to require monitoring the ringer failure in a ringer-generating circuit only when the terminal equipment receives a call from a calling telephone, and to avoid continuing a call in spite of the presence of the ringer failure.

The objective of the present invention is achieved by a circuit for notifying a ringer failure, applicable to a mobile body communication technology prescribed by a wireless local loop, comprising:

a ringer-generating circuit for producing and then outputting a ringer signal in response to detection of call arrival from a calling telephone;

a control section for controlling call remittance, call arrival, conversation, or call waiting, the control section executing control, in response to call arrival from the calling telephone, to permit the ringer-generating circuit to be oscillated, thereby producing and then outputting the ringer signal, the control section providing further control to permit the ringer signal to be transmitted to a called telephone, thereby causing the called telephone to emit a sound of call arrival, the control section practicing yet further control to permit voice data to be exchanged between a base station and the called telephone when a conversation is held between the calling telephone and the called telephone; and, a ringer failure-detecting circuit connected to the control section, the ringer failure-detecting circuit notifying the control section of the ringer failure in the ringer-generating circuit when detecting such a failure upon receipt of a call from the calling telephone, wherein the control section is designed to notify the base station through a wireless line that the ringer failure in the ringer-generating circuit has been detected.

The objective of the present invention is achieved by a circuit for notifying a ringer failure, applicable to a mobile body communication technology prescribed by a wireless local loop, comprising:

a ringer-generating circuit for producing and then outputting a ringer signal in response to detection of call arrival from a calling telephone;

a ringer failure-detecting circuit monitoring a ringer failure in the ringer-generating circuit upon receipt of a call from the calling telephone, the ringer failure-detecting circuit sending out a detection signal when detecting the failure; and, a control section for executing control, in response to call arrival from the calling telephone, to permit the ringer-generating circuit to be oscillated, thereby producing and then outputting the ringer signal, the control section notifying a base station through a wireless line, when receiving the detection signal from the ringer failure-detecting circuit, that the ringer failure in the ringer-generating circuit has been detect.

The objective of the present invention is realized by a system for notifying a ringer failure in a mobile body communication technology prescribed by a wireless local loop, comprising:

a called mobile body and a base station, both of which are connected together through a wireless line; the called mobile body comprising:

a ringer-generating circuit for producing and then outputting a ringer signal in response to detection of call arrival from a calling mobile body;

a ringer failure-detecting circuit monitoring the ringer failure in the ringer-generating circuit upon receipt of a call from the calling mobile body, the ringer failure-detecting circuit sending out a detection signal when detecting the failure; and, a control section for executing control, in response to call arrival from the calling mobile body, to permit the ringer-generating circuit to be oscillated, thereby producing and then outputting the ringer signal, the control section notifying a base station through a wireless line, when receiving the detection signal from the ringer failure-detecting circuit, that the ringer failure in the ringer-generating circuit has been detect, the base station comprising:

a means for notifying the calling mobile body, when the control section advises the base station of the ringer failure in the ringer-generating circuit, that the ringer-generating circuit is precluded from calling the called mobile body.

The objective of the present invention is accomplished by a method for notifying a ringer failure, applicable to a mobile body communication technology prescribed by a wireless local loop, comprising steps of:

controlling call remittance, call arrival, conversation, or call waiting;

executing control, in response to call arrival from a calling telephone, to permit a ringer-generating circuit for generating and then sending out a ringer signal to be oscillated, thereby producing and then outputting the ringer signal; and, monitoring the ringer failure in the ringer-generating circuit upon receipt of a call from the calling telephone, and then notifying the base station through a wireless line, when detecting the ringer failure in the ringer-generating circuit, that such a failure has been detected.

The present invention as structured above exhibits the following effects:

A first effect is that the ringer failure in the terminal equipment can be recognized at the base station.

A second effect is that there is no need to always monitor the ringer failure in the ringer-generating circuit, and instead such a failure may be monitored only when the terminal equipment receives a call from the calling telephone, with the result that a saving in electric current to be consumed is achievable. In particular, the use of the terminal equipment of a type designed to provide a battery-assisted backup action makes it possible to avoid worthless battery consumption. This effect results from situations in which, only when the terminal equipment receives a call from the calling telephone, the ringer failure-detecting circuit detects and flattens the ringer signal from the oscillation circuit, and further which, when determining that the detected output is equal to or less than a predetermined threshold value, then the ringer failure-detecting circuit judges that the oscillation circuit has been out of order, and subsequently reports such a judgement to the control section.

A third effect is that it is possible to avoid continuing a call in spite of the presence of the ringer failure. This effect results from situations in which, only when the terminal equipment receives a call from the calling telephone, the control section notifies the base station of the occurrence of the ringer failure in response to such a notification from the ringer failure-detecting circuit, and further which the base station subsequently announces the same notification to the calling telephone.

BRIEF DESCRIPTION OF THE DRAWINGS

This and other objects, features and advantages of the present invention will become more apparent upon a reading of the following detailed description and drawings, in which.

DESCRIPTION OF THE EMBODIMENTS

Figure 1:
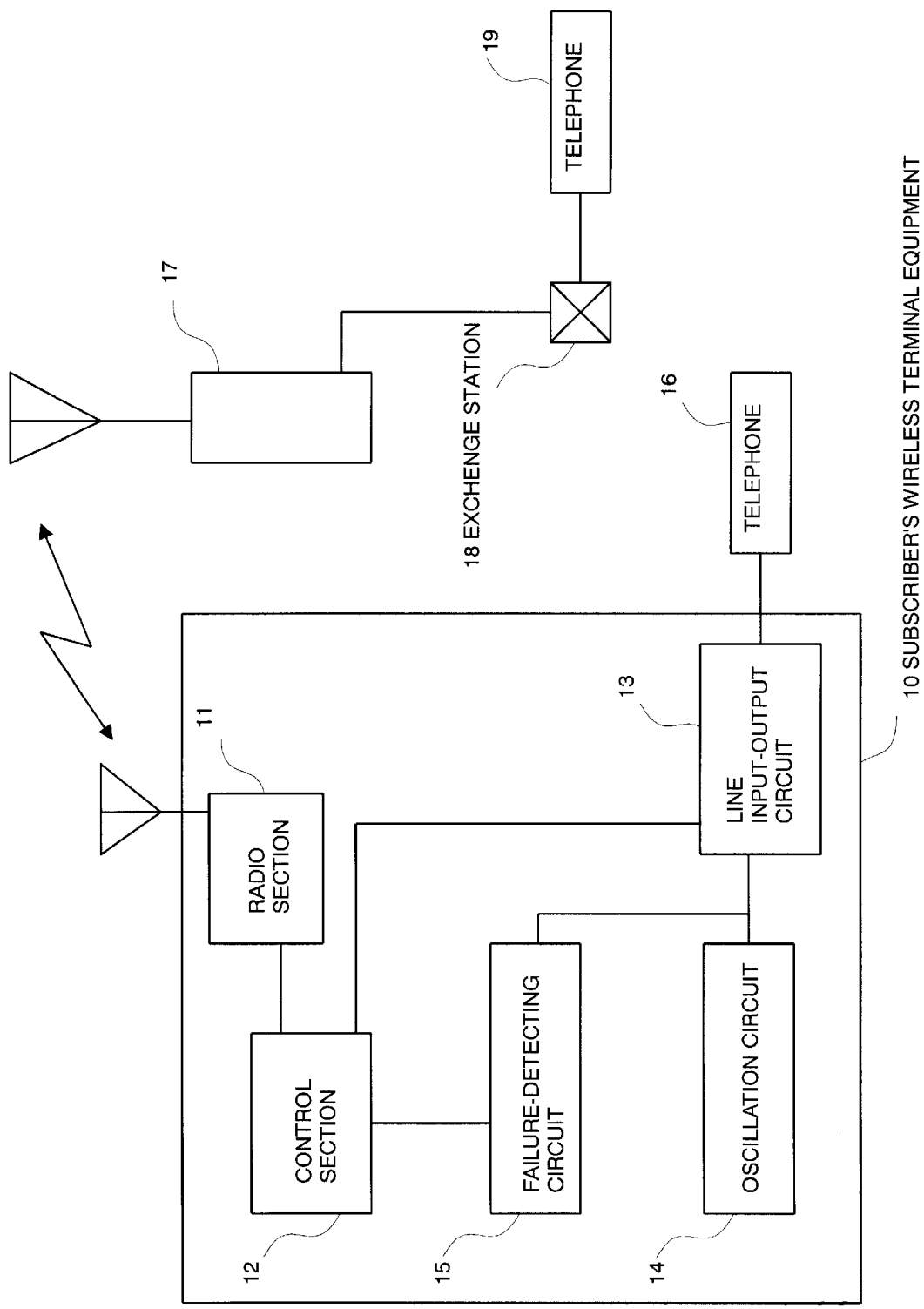
FIG. 1 is a block diagram, illustrating an embodiment of a circuit for notifying a ringer failure according to the present invention; and, FIG. 2 is a flow chart, illustrating an embodiment in which a method for notifying a ringer failure is practiced in the aforesaid circuit in FIG. 1.

Embodiments of the present invention will now be described in detail with reference to the drawings. FIG. 1 is a block diagram, illustrating an embodiment of a circuit for notifying a ringer failure according to the present invention.

A subscriber's wireless terminal equipment 10 according to the present embodiment is characterized in that, when a ringer failure-detecting circuit 15 (given as a failure-detecting circuit 15 in FIG. 1) detects a failure (ringer failure) in an oscillation circuit 14 (ringer-generating circuit 14), then the terminal equipment 10 notifies a base station 17 through a subscriber's line (wireless line) that the ringer failure has occurred. Further, the base station 17 subsequently announces such a notification to a dialer.

Referring to FIG. 1, the terminal equipment 10 is applicable to a mobile body communication technology, which is called a wireless local loop (WLL). The terminal equipment 10 includes a radio section 11, a control section 12, a line input-output circuit 13, the oscillation circuit 14, and the ringer failure-detecting circuit 15. A telephone (called telephone) 16 is connected to the terminal equipment 10. When a conversation is held between the telephone 16 and another telephone (calling telephone) 19, then the base station 17 is connected by wireless to the terminal equipment 10 through the subscriber's line (wireless line). In this instance, communication between the telephones 16 and 19 is controlled through an exchange station 18.

The control section 12 is connected to the radio section 11, the line input-output circuit 13, and the ringer failure-detecting circuit 15 for controlling call remittance, call arrival, conversation, call waiting, etc. The control section 12 further controls the line input-output circuit 13. When the terminal equipment 10 receives a call from the calling telephone 19, then the control section 12 permits the oscillation circuit 14 to be oscillated, thereby producing and then outputting a ringer signal. The ringer signal is then transmitted to the called telephone 16 through the line input-output circuit 13. As a result, the called telephone 16 emits a sound of call arrival. When a conversation is held between the telephones 16 and 19, then the control section 12 permits voice data to be exchanged between the base station 17 and the called telephone 16 through both of the radio section 11 and the line input-output circuit 13.

The ringer failure-detecting circuit 15 is connected to both of the control section 12 and the line input-output circuit 13. When detecting a failure in the ringer-generating circuit 14 upon receipt of a call from the calling telephone 19, then the ringer failure-detecting circuit 15 reports such failure detection to the control section 12. Then, the control section 12 notifies the base station 17 by wireless through the radio section 11 that the ringer failure in the ringer-generating circuit 14 has been detected.

Figure 2:
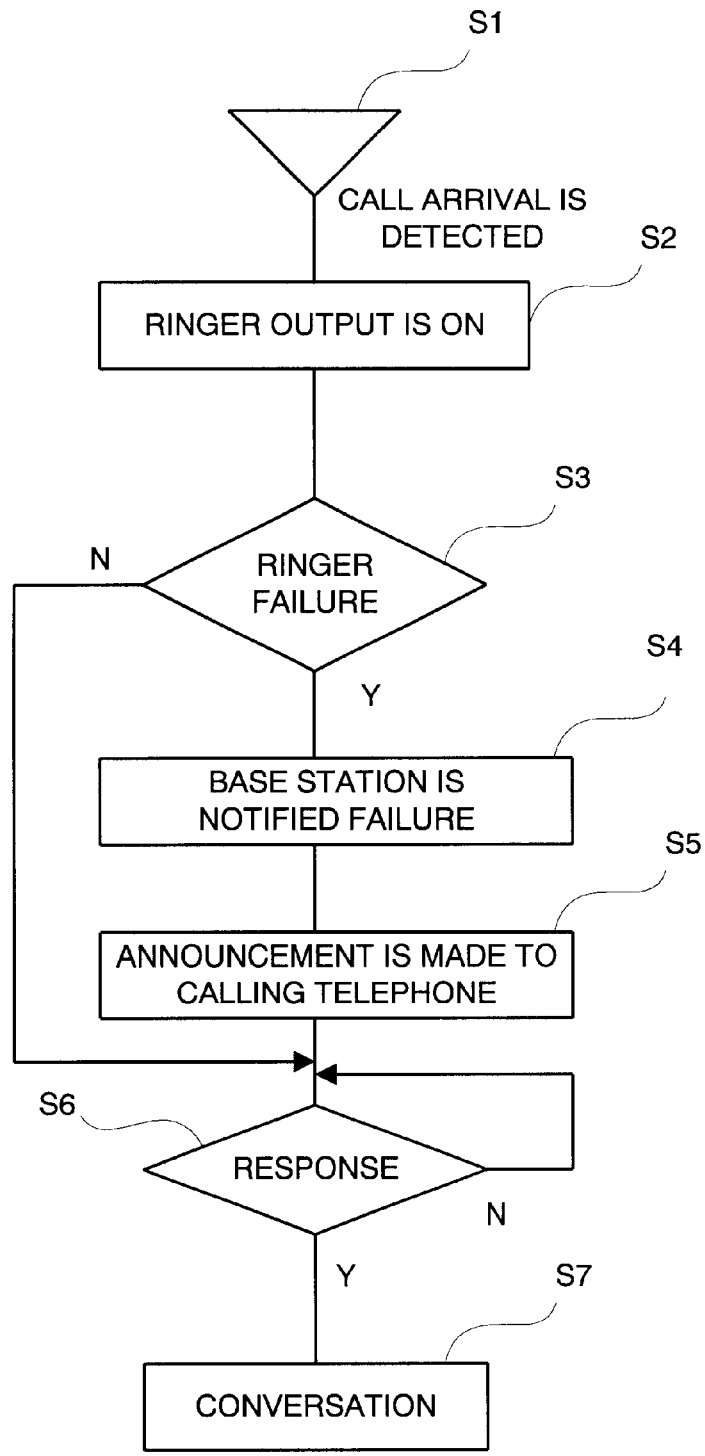

Next, a course of action according to the present embodiment will be described with reference to a flow chart of FIG. 2. FIG. 2 is a flow chart, illustrating an embodiment in which a method for notifying a ringer failure is practiced in the subscriber's wireless terminal equipment 10 of FIG. 1.

The method according to the present embodiment is characterized in that, when the ringer failure-detecting circuit 15 detects a failure (ringer failure) in the ringer-generating circuit 14, then the terminal equipment 10 notifies the base station 17 through the subscriber's line (wireless line) that the ringer failure has occurred, and further that the base station 17 subsequently transfers such a notification to a dialer.

Referring to FIG. 2, when the terminal equipment 10 receives a call from the calling telephone 19, the base station 17 executes a call in accordance with procedures as prescribed by RCR-STD28 (step S1). RCR-STD28 is a standard specification defined by the Research & Development Center for Radio System. The standard specification covers an air interface between a base station (which refers to the base station 17) and a terminal (which refers to the terminal equipment 10). When call arrival is detected, then the control section 12 permits the oscillation circuit 14 to be actuated so as to generate and then output a ringer signal. Then, the ringer signal is transmitted to the called telephone 16 through the line input-output circuit 13 (step S2).

In order to monitor the ringer signal to be fed into the telephone 16, the ringer failure-detecting circuit 15 detects and flattens output (the ringer signal) from the oscillation circuit 14. When a determination is made that the detected output is equal to or less than a predetermined threshold value ("Y" in step S3), then the ringer failure-detecting circuit 15 judges that the oscillation circuit 14 has been out of order, and subsequently sends such a judgement to the control section 12 (step S3). Then, the control section 12 notifies the base station 17 through the radio section 11 that the ringer-generating circuit 14 has experienced a failure (the ringer failure) (step S4).

When such a notification is transmitted from the terminal equipment 10 to the base station 17, then the base station.17 announces the dialer-through the exchange station 18 that the ringer-generating circuit 14 is precluded from calling the called telephone 16 (step S5).

Meanwhile, when the ringer failure-detecting circuit 15 determines that the detected output generated and then outputted as previously mentioned is greater than a predetermined threshold value ("N" in step S3), or when the called telephone 16 responds ("Y" in step S6) after the dialer is notified through the exchange station 18 that the ringer-generating circuit 14 is impossible to call the called telephone 16 (step S5), then a conversation is held between the telephones 16 and 19 (step S7).

As described above, according to the present embodiment, the ringer failure in the terminal equipment 10 is appreciable at the base station 17.

In addition, only when the terminal equipment 10 receives a call from the calling telephone 19, the ringer failure-detecting circuit 15 detects and flattens the ringer signal from the oscillation circuit 14. When determining that the detected output is equal to or less than a predetermined threshold value, then the ringer failure-detecting circuit 15 judges that the oscillation circuit 14 has been faulty, and subsequently reports such a judgement to the control section 12. This system eliminates the need to always monitor the ringer failure in the ringer-generating circuit 14, and instead requires monitoring such a failure only when the terminal equipment 10 receives a call from the calling telephone 19. As a result, a saving in electric current to be consumed is achievable. In particular, the use of the terminal equipment 10 of a type designed to provide a battery-assisted backup action makes it possible to avoid worthless battery consumption.

Further, only when the terminal equipment 10 receives a call from the calling telephone 19, the control section 12 notifies the base station 17 of the occurrence of the ringer failure in response to such a notification from the ringer failure-detecting circuit 15. The base station 17 subsequently transfers the same notification to the calling telephone 19. This system provides an effect that avoids continuing a call in spite of the presence of the ringer failure.

It is-obvious that the present invention is not limited to the above-described embodiments, but such embodiments may be changed properly within the scope of a technical concept of the present invention. In addition, the number, positions, shapes, etc. of the preceding components are not limited to those in the above-described embodiments, but may be modified to a degree adequate for practicing the present invention.

The entire disclosure of Japanese Patent Application No. 10-361464 filed on Dec. 18, 1998 including specification, claims, drawing and summary are incorporated herein by reference in its entirety.

What is claimed is:

1. A circuit for notifying a ringer failure, applicable to a mobile body communication technology prescribed by a wireless local loop, comprising:

a ringer-generating circuit for producing and then outputting a ringer signal in response to detection of call arrival from a calling telephone;

a control section for controlling call remittance, call arrival, conversation, and call waiting, said control section executing control, in response to call arrival from said calling telephone, to permit said ringer-generating circuit to be oscillated, thereby producing and then outputting said ringer signal, said control section providing further control to permit said ringer signal to be transmitted to a called telephone, thereby causing said called telephone to emit a sound of call arrival, said control section practicing yet further control to permit voice data to be exchanged between a base station and said called telephone when a conversation is held between said calling telephone and said called telephone; and, a ringer failure-detecting circuit connected to said control section, said ringer failure-detecting circuit notifying said control section of said ringer failure in said ringer-generating circuit when detecting such a failure upon receipt of a call from said calling telephone, wherein said control section is designed to notify said base station through a wireless line that said ringer failure in said ringer-generating circuit has been detected.

2. A circuit for notifying a ringer failure as defined in claim 1, wherein said control section is designed to notify said base station through a wireless line of a detected ringer failure in said ringer-generating circuit when said ringer failure-detecting circuit detects such a failure.

3. A circuit for notifying a ringer failure as defined in claim 1, wherein said ringer failure-detecting circuit detects and flattens said ringer signal in order to monitor said ringer signal to be sent to said called telephone, said ringer failure-detecting circuit being designed to judge, when determining that such detected output does not exceed a predetermined threshold value, that said ringer-generating circuit is out of order, and then to notify said control section of such a judgement.

4. A circuit for notifying a ringer failure as defined in claim 1, wherein said base station is designed to notify said calling telephone, when said control section advises said base station of said ringer failure in said ringer-generating circuit, that said ringer-generating circuit is precluded from calling said called telephone.

5. A circuit for notifying a ringer failure, applicable to a mobile body communication technology prescribed by a wireless local loop, comprising:

a ringer-generating circuit for producing and then outputting a ringer signal in response to detection of call arrival from a calling telephone;

a ringer failure-detecting circuit monitoring said ringer failure in said ringer-generating circuit upon receipt of a call from said calling telephone, said ringer failure-detecting circuit sending out a detection signal when detecting said failure; and, a control section for executing control, in response to call arrival from said calling telephone, to permit said ringer-generating circuit to be oscillated, thereby producing and then outputting said ringer signal, said control section notifying a base station through a wireless line, when receiving said detection signal from said ringer failure-detecting circuit, that said ringer failure in said ringer-generating circuit has been detect.

6. A circuit for notifying a ringer failure as defined in claim 5, wherein said ringer failure-detecting circuit comprises:

a detecting means for detecting and flattening said ringer signal; and, a means for judging, when determining that output from said detecting means is at most a predetermined threshold value, that said ringer-generating circuit is out of order, and then for notifying said control section of such a judgement.

7. A system for notifying a ringer failure in a mobile body communication technology prescribed by a wireless local loop, comprising:

a called mobile body and a base station, both of which are connected together through a wireless line;

said called mobile body comprising:

a ringer-generating circuit for producing and then outputting a ringer signal in response to detection of call arrival from a calling mobile body;

a ringer failure-detecting circuit monitoring said ringer failure in said ringer-generating circuit upon receipt of call arrival from said calling mobile body, said ringer failure-detecting circuit sending out a detection signal when detecting said failure; and, a control section for executing control, in response to call arrival from said calling mobile body, to permit said ringer-generating circuit to be oscillated, thereby producing and then outputting said ringer signal, said control section notifying a base station through a wireless line, when receiving said detection signal from said ringer failure-detecting circuit, that said ringer failure in said ringer-generating circuit has been detect, said base station comprising:

a means for notifying said calling mobile body, when said control section advises said base station of said ringer failure in said ringer-generating circuit, that said ringer-generating circuit is precluded from calling said called mobile body.

8. A system for notifying a ringer failure as defined in claim 7, wherein said ringer failure-detecting circuit comprises:

a detecting means for detecting and flattening said ringer signal; and, a means for judging, when determining that output from said detecting means does not exceed a predetermined threshold value, that said ringer-generating circuit is out of order, and then for notifying said control section of such a judgement.

9. A method for notifying a ringer failure, applicable to a mobile body communication technology prescribed by a wireless local loop, comprising steps of:

controlling call remittance, call arrival, conversation, and call waiting;

executing control, in response to call arrival from a calling telephone, to permit a ringer-generating circuit for generating and then sending out a ringer signal to be oscillated, thereby producing and then outputting said ringer signal; and, monitoring said ringer failure in said ringer-generating circuit upon receipt of a call from said calling telephone, and then notifying said base station through a wireless line, when detecting said ringer failure in said ringer-generating circuit, that such a failure has been detected.

10. A method for notifying a ringer failure as defined in claim 9, further comprising steps of: notifying said base station through a wireless line, when detecting said ringer failure in said ringer-generating circuit, that such a failure has been detected.

11. A method for notifying a ringer failure as defined in claim 9, wherein said step of detecting said ringer failure comprises steps of:

detecting and flattening said ringer signal; and, judging, when determining that such detected output is at most a predetermined threshold value, that said ringer-generating circuit is out of order, and then detecting said ringer failure.

12. A method for notifying a ringer failure as defined in claim 9, further comprising a step of: notifying said calling telephone, when said ringer failure in said ringer-generating circuit is notified, that said ringer-generating circuit is precluded from calling a called telephone.

* * * * *